US007957532B2

(12) United States Patent
Chen et al.

(10) Patent No.: US 7,957,532 B2
(45) Date of Patent: Jun. 7, 2011

(54) DATA PROTECTION FOR A MOBILE DEVICE

(75) Inventors: Yuqun Chen, Bellevue, WA (US);
Zicheng Liu, Bellevue, WA (US);
Mariusz H. Jakubowski, Bellevue, WA (US); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 11/474,016

(22) Filed: Jun. 23, 2006

(65) Prior Publication Data

US 2007/0297610 A1    Dec. 27, 2007

(51) Int. Cl.
*H04K 1/00* (2006.01)
*H04L 9/00* (2006.01)
*H04L 9/08* (2006.01)

(52) U.S. Cl. ........ 380/270; 713/193; 380/277; 380/278; 380/279; 380/286

(58) Field of Classification Search .................. 713/193; 380/270, 277–279, 286
See application file for complete search history.

(56) References Cited

U.S. PATENT DOCUMENTS

| 5,392,356 | A | * | 2/1995 | Konno et al. ............... 380/249 |
| 5,517,567 | A | | 5/1996 | Epstein |
| 5,548,649 | A | * | 8/1996 | Jacobson ...................... 713/153 |
| 6,026,293 | A | | 2/2000 | Osborn |
| 6,108,424 | A | | 8/2000 | Pitiot |
| 6,167,252 | A | | 12/2000 | Cohen |
| 6,201,871 | B1 | | 3/2001 | Bostley, III et al. |
| 6,311,171 | B1 | * | 10/2001 | Dent ............................... 705/64 |
| 6,460,138 | B1 | | 10/2002 | Morris |
| 6,950,521 | B1 | | 9/2005 | Marcovici et al. |
| 7,050,993 | B1 | * | 5/2006 | Piikivi et al. .................... 705/26 |
| 7,275,685 | B2 | * | 10/2007 | Gray et al. ..................... 235/380 |
| 7,325,132 | B2 | * | 1/2008 | Takayama et al. ............ 713/168 |
| 7,596,696 | B1 | * | 9/2009 | Perlman ......................... 713/165 |
| 2002/0023215 | A1 | * | 2/2002 | Wang et al. .................... 713/171 |
| 2003/0165240 | A1 | * | 9/2003 | Bantz et al. ...................... 380/54 |
| 2004/0052379 | A1 | * | 3/2004 | Nishimoto et al. ........... 380/281 |
| 2005/0120225 | A1 | | 6/2005 | Kirsch et al. |
| 2006/0013397 | A1 | * | 1/2006 | Dorsch et al. ................. 380/256 |
| 2006/0025110 | A1 | | 2/2006 | Liu |
| 2006/0190724 | A1 | * | 8/2006 | Adams et al. ................. 713/166 |
| 2007/0297610 | A1 | * | 12/2007 | Chen et al. .................... 380/270 |
| 2009/0110195 | A1 | * | 4/2009 | Paykin et al. ................. 380/251 |

OTHER PUBLICATIONS

Racheria,G., et al,"Security and privacy issues in wireless and mobile computing", http://ieeexplore.ieee.org/xpls/abs_all.jsp?arNumber=905910.
Pfitzmann, A., et al, "Trusting mobile user devices and security modules",http://ieeexplore.ieee.org/search/freesrchabstract.jsp?arnumber=566159&isnumber=12264&punumber=2&k2do.
Hubaux,Jean-Pierre, et al,"The Quest for Security in Mobile Ad Hoc Networks",http://delivery.acm.org/10.1145/510000/501437/p146-hubaux.pdf?key1=501437&key2=1643094411&coll=Por.
Capkun S. et al.,"Self-organized public-key management for mobile ad hoc networks",http://ieeexplore.ieee.org/search/freesrchabstract.jsp?arnumber=1195151&isnumber=26880&punum.

* cited by examiner

*Primary Examiner* — Ponnoreay Pich
*Assistant Examiner* — Sayed Beheshti Shirazi

(57) ABSTRACT

A network-based data protection scheme for a mobile device utilizes encryption techniques and a remote key server that stores encryption keys on behalf of the mobile device. The mobile device stores encrypted data, preferably having no unencrypted counterpart stored therewith. On an as-needed basis, the mobile device requests a decryption key (or an encrypted version of a decryption key) from the key server, where the decryption key can be used by the mobile device to decrypt the encrypted information. The key server transmits the decryption key to the mobile device after authenticating the user of the mobile device.

20 Claims, 7 Drawing Sheets

DATA PROTECTION FOR A MOBILE DEVICE

BACKGROUND

The techniques and technologies described herein relate to a data protection scheme for mobile devices. Mobile devices, such as mobile phones, play an increasingly versatile role in daily life. Many new features and services are being developed in an attempt to expand mobile phones beyond their traditional role of voice and message transmission. Some of these new features and services have more stringent requirements for data security than do existing applications. For example, the viability of mobile shopping and "mobile phone as wallet" (two mass-market and potentially lucrative services) depends on the ability of the mobile phones and the service providers to ensure the safety of the user's private information against various security threats, including the physical theft of the mobile phones and/or the illegitimate use of a mobile phone. Unauthorized possession of a user's mobile phone may lead to a compromise of the user's private and sensitive data.

Some mobile device service providers allow users to store important information at the network level such that the service providers act as data agents for the end users. Despite the conveniences of this approach, the centralization of user information in connection with network storage can be vulnerable to hacker attacks. For this reason, many consumers refuse to let online merchants maintain credit card information. Some mobile devices provide an interface to capture a user's fingerprints for use with an authentication protocol. This solution can be vulnerable because fingerprints can be relatively easy to capture, particularly if a thief has possession of the user's mobile device (which will likely contain many fingerprints).

Hardware-based solutions may be utilized to protect user data stored by mobile devices. These solutions employ encryption/decryption techniques to protect the user's sensitive data. The entire protection mechanism utilized by these solutions resides on the mobile device itself, thus making the protected data vulnerable to attack by a thief having sufficient hardware know-how, diagnostic equipment, and hacking abilities.

BRIEF SUMMARY

A data protection scheme for a mobile device leverages encryption technology to protect information stored on the mobile device. Encrypted information stored at the mobile device is decrypted using a data key that is maintained by a remote key server. The data key is communicated to the mobile device on an as-needed basis, and the data key is not permanently stored by the mobile device, thus protecting the encrypted information even if the mobile device is lost or stolen. The key server performs an authentication procedure to ensure that only authorized users of the mobile device can initiate transfer of the data key from the key server to the mobile device. For example, the authentication procedure may require the user to enter a password (e.g., a personal identification number) at the mobile device. The data protection scheme may be carried out with a mobile device having a memory element for storing the encrypted information, a key module that receives and processes the data key, and a secure data module that manages data encryption and decryption.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of an example embodiment may be derived by referring to the detailed description and claims when considered in conjunction with the following figures, wherein like reference numbers refer to similar elements throughout the figures.

DETAILED DESCRIPTION

Figure 1:
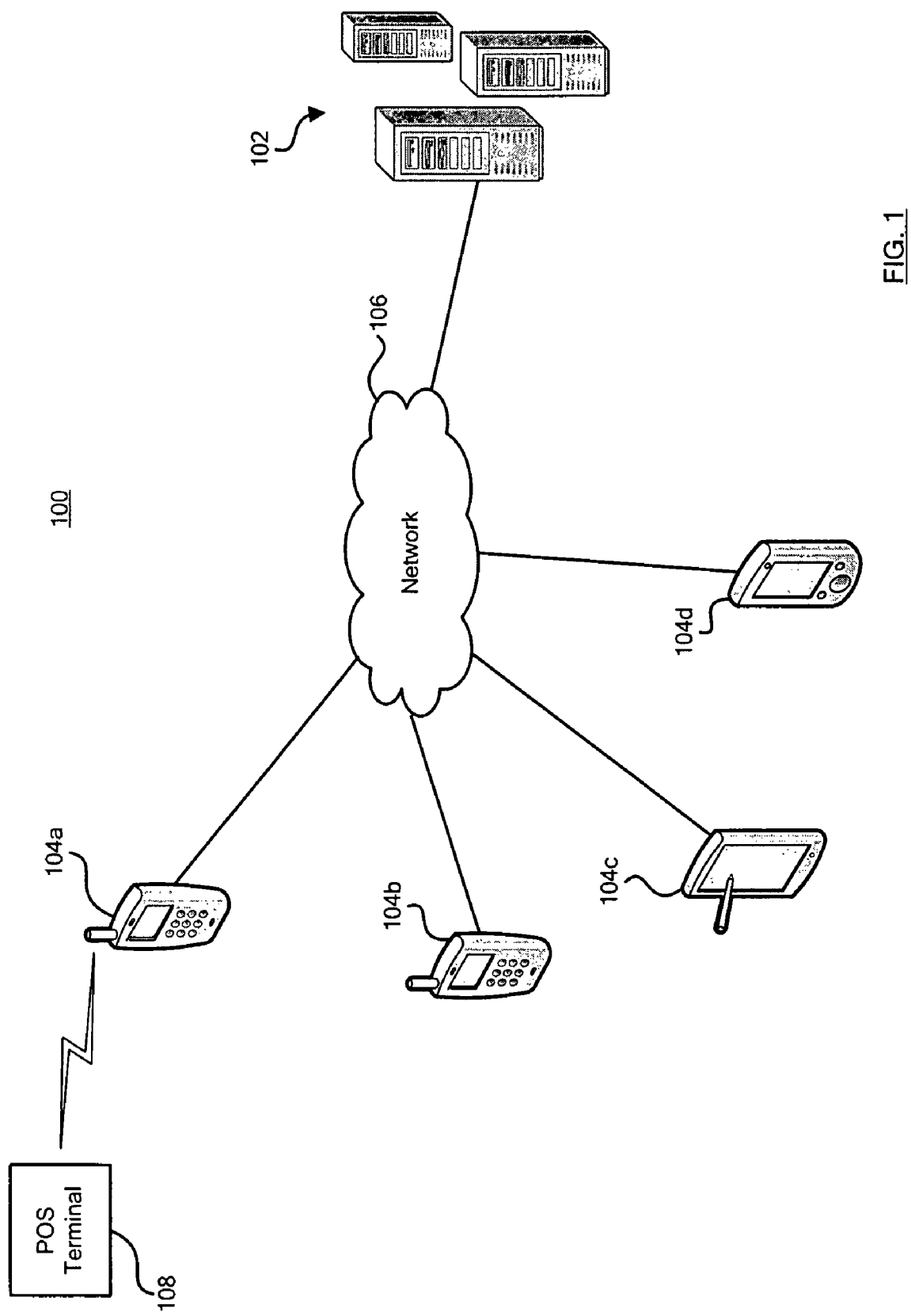
FIG. 1 is a schematic representation of an operating environment for a network-based data protection system for mobile devices.

The following detailed description is merely illustrative in nature and is not intended to limit the embodiments described herein or the application and uses of such embodiments.

Example embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that practical embodiments may be practiced in conjunction with any number of data transmission protocols and that the system described herein is merely one example embodiment.

For the sake of brevity, conventional techniques related to mobile electronic devices, credit and debit card transaction processing, wireless data communication, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example embodiment.

The following description refers to elements, nodes, or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict certain arrangements of elements, additional or fewer elements, devices, features, or components may be present in an embodiment (assuming that the functionality of the system is not adversely affected).

Expanding the mobile phone beyond its traditional role of voice communication and messaging often requires strong data protection schemes. Without qualitative improvements in mobile phone security, consumers will be reluctant to trust and embrace many new services that would bring them greater convenience and further promote digital commerce. The techniques and technologies described herein can be utilized to secure information stored in a mobile device, thus protecting against physical theft and server hijacking. One embodiment combines the traditional ATM security model, strong cryptography, and server-based activation to achieve simplicity, ease of use, and robustness.

Although the following description focuses on embodiments that handle electronic payment applications and account information that are utilized as payment mechanisms for purchases of goods, services, and the like, the technologies and techniques described herein are not so limited. In other words, the network-based data protection scheme described herein can be utilized to secure any type or context of data stored in a mobile device.

FIG. 1 is a schematic representation of an operating environment 100 for a network-based data protection system for mobile devices. Operating environment 100 may include a suitably configured key server architecture 102 and one or more mobile devices 104 configured to communicate with key server architecture 102 via a data communication network 106. Key server architecture 102 communicates with mobile devices 104 to support the data protection schemes described in detail below.

Key server architecture 102 may include one or more computing devices having the processing logic and functional capacities described in more detail below. Briefly, key server architecture 102 maintains encryption and/or decryption keys and manages the distribution of the keys to mobile devices 104 on an as-needed basis such that mobile devices 104 can decrypt encrypted information. The operation of key server architecture 102 is described in more detail below.

Data communication network 106 may utilize any suitable data communication, telecommunication, wireless, wired/cabled, or other technology. In practical deployments, data communication network 106 can be realized using any number of devices, systems, or components, and data communication network 106 may utilize any number of communication links. For example, data communication network 106 may include or be realized as a LAN, a WAN, a WLAN, the Internet, a cellular service network, a paging service network, a PBX, or the like. In practice, key server architecture 102 may be coupled to data communication network 106 using any suitable communication link, which may be a wired link, a wireless link, or a link that combines wired and wireless technologies. Each mobile device 104 may also be coupled to data communication network 106 using a wired communication link, a wireless communication link, or a communication link that combines wired and wireless technologies.

Each mobile device 104 may be a computing device having a particular configuration and platform, and each client device 104 can host one or more data handling applications that process or access protected data. For example, operating environment 100 may include, without limitation, any number of the following mobile devices 104: a mobile telephone 104a; a mobile telephone 104b; a portable computer 104c, such as a personal digital assistant, a pocket personal computer, a tablet computer, or a laptop computer; a video game device 104d, such as a portable video game device or a video game console; or the like. The particular physical configuration of a mobile device 104, the applications hosted by a mobile device 104, and the manner in which a mobile device 104 communicates with key server architecture 102 can be selected to suit the needs of the individual user and/or to accommodate the particular system deployment. A mobile device 104 is generally configured to access or receive encryption/decryption keys maintained by key server architecture 102 and encrypt/decrypt information using those keys. FIG. 1 depicts one practical deployment where mobile device 104a communicates with a point of sale ("POS") terminal 108 to support an electronic payment transaction that requires access to secure data such as a credit card number. In this deployment, mobile device 104a stores the credit card number and possibly other credit card account information in an encrypted form, and key server architecture 102 supplies a decryption key that enables mobile device 104a to decrypt the credit card account information.

Figure 2:
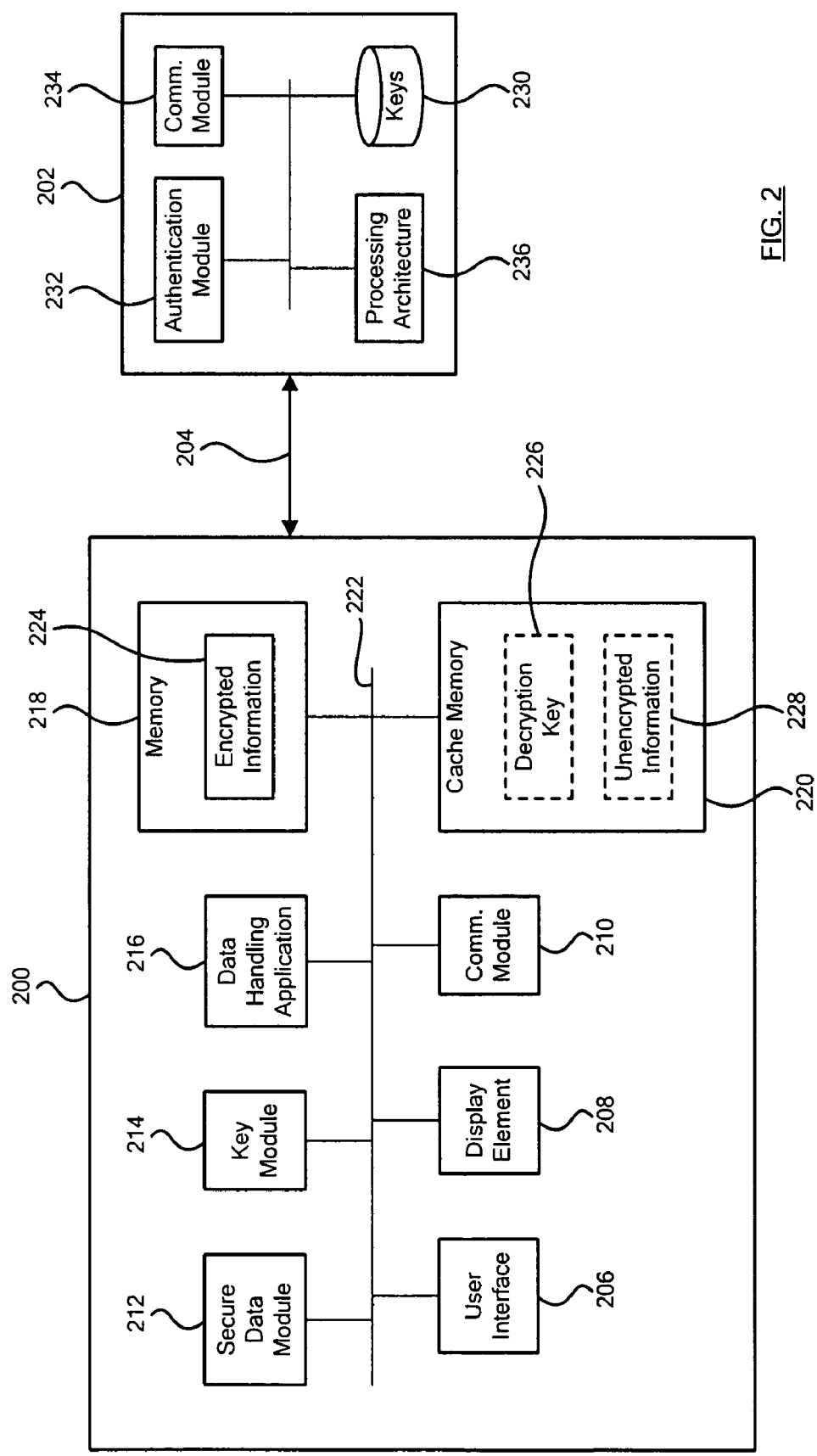
FIG. 2 is a schematic representation of a mobile device and a remote key server configured to support a network-based data protection scheme for the mobile device.

FIG. 2 is a schematic representation of a mobile device 200 and a remote key server 202 configured to implement a network-based data protection system for the mobile device 200. For simplicity, FIG. 2 merely depicts a communication link 204 between mobile device 200 and key server 202 (rather than a data communication network).

Mobile device 200 supports the data protection techniques and technologies described herein. Mobile device 200 may be realized as mobile telephone 104a (see FIG. 1), a personal digital assistant, a digital media player, a pocket personal computer, or the like. Mobile device 200 generally includes: a user interface 206; a display element 208; a communication module 210; a secure data module 212; a key module 214; a data handling application 216; and a memory element 218 having a suitable amount of data storage capacity. An embodiment of mobile device 200 may also include a cache memory element 220 having a suitable amount of data-storage capacity. Some or all of these elements may be coupled together with a bus 222 or any suitable interconnection arrangement or architecture. Depending upon the particular implementation, mobile device 200 may include, without limitation: a near-field-communication ("NFC") radio; a cellular radio; a wired data communication interface; and other components that may be utilized to support conventional features of mobile device 200. Such conventional features will not be described in detail herein.

Although not separately shown in FIG. 2, mobile device 200 includes a suitably configured processing architecture that supports the operation of mobile device 200, including the data protection schemes described in more detail herein. The processing architecture may be realized with any number of hardware, software, and/or firmware components, and the processing architecture may include any number of logical or functional modules. The processing architecture may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

In practice, the processing architecture may be suitably configured to perform and/or support the various operations, features, techniques, functions, and operations described herein. Moreover, although FIG. 2 depicts certain elements as distinct blocks or modules, the processing architecture may include or incorporate functional components (or portions thereof) of mobile device 200, such as communication module 210, secure data module 212, or key module 214.

User interface 206 may include, without limitation: a keypad; navigation buttons; a display; a microphone; or a speaker. User interface 206 may also include or be configured to function as, without limitation: a touch pad; a touch screen (on display element 208); a stylus pad (on display element 208); a cursor pointing device; or the like. User interface 206 enables the user of mobile telephone 200 to manipulate applications and features supported by mobile telephone 200. In particular, user interface 206 enables the user to enter information that may be needed for authentication purposes, e.g., a password, a PIN, or the like.

Display element 208 may leverage known display technologies, and the specific format and configuration of display element 208 may be dictated by the form factor of mobile device 200. A user of mobile device 200 may utilize display 208 to enter authentication information, to select applications, to input data to be encrypted, or the like.

Communication module 210 may represent processing logic that is suitably configured to support the data communication protocols, schemes, and techniques utilized by mobile device 200. In practice, communication module 210 or a portion thereof may be considered to be part of the processing architecture of mobile device 200. For simplicity, FIG. 2 depicts one communication module 210. An embodiment of mobile device 200 may, however, include any number of communication modules. Communication module 210 may be configured to: process data received or transmitted by a cellular radio; process data received or transmitted by an NFC radio; process data received or transmitted by a wired interface; and/or process data received or transmitted by other technologies and techniques supported by mobile device 200.

For wireless communication of data, communication module 210 may support any number of suitable wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

Referring again to FIG. 1, mobile device 200 may utilize an NFC radio and communication module 210 to support wireless near field communication with POS terminal 108. The NFC radio may include any number of RF front end components, any number of transmitters, any number of receivers, and/or any number of transceivers, depending upon the particular implementation. Notably, the NFC radio need not rely on a cellular communication cellular network, an 802.11 network, or other non-NFC networks to communicate with POS terminal 108. An embodiment of mobile device 200 may utilize the NFC radio to communicate decrypted information (such as credit card account information, debit card account information, or the like) to POS terminal 108 during a payment transaction supported by data handling application 216.

For communication of data over a cable, a wired connection, or other physical link, communication module 210 may support any number of suitable data communication protocols, techniques, or methodologies, including, without limitation: Ethernet; home network communication protocols; USB; IEEE 1394 (Firewire); hospital network communication protocols; and proprietary data communication protocols.

Memory element 218 may be realized as RAM memory, flash memory, EPROM memory, EEPROM memory, registers, a hard disk, a removable disk, a CD-ROM, or any other form of storage medium known in the art. In this regard, memory element 218 can be coupled to the processing architecture of mobile device 200 such that the processing architecture can read information from, and write information to, memory element 218. In the alternative, memory element 218 may be integral to the processing architecture. As an example, the processing architecture and memory element 218 may reside in an ASIC. In this example, memory element 218 is utilized to store encrypted information 224 for mobile device 200, data associated with the various applications supported by mobile device 200, and other information that may relate to conventional operating features of mobile device 200. Memory element 218 may also store unencrypted or "plain text" data (such as metadata) that describes or is otherwise associated with encrypted information 224. In certain embodiments of mobile device 200, encrypted information 224 represents encrypted payment transaction data, which may be, for example: credit card account data; debit card account data; stored value card data; or the like. In other embodiments of mobile device 200, encrypted information 224 represents sensitive or confidential data, which may be, for example: personal data; a social security number; telephone numbers; lock combinations; or the like.

Cache memory element 220, which is an optional feature of mobile device 200, may be generally configured as described above for memory element 218. In certain embodiments of mobile device 200, cache memory element 220 is utilized to temporarily store one or more decryption keys 226 (and possibly encryption keys) for a caching period, e.g., 20 minutes or any appropriate period of time selected to suit the needs of the particular application or deployment. When the caching period expires, the cached data is cleared from cache memory element 220. Thereafter, the user will need to re-authenticate himself to access the private data again. In one embodiment, the user is able to set the caching period, and the user can disable the caching feature by, for example, setting the caching period to be equal to zero minutes.

The nomenclature $KEY_{data}^{user}$ is used herein to identify a decryption key 226 utilized by mobile device 200 to decrypt encrypted information 224. As described in more detail below, a cached decryption key 226 may be desirable to provide a short window of time during which authentication and network retrieval of the decryption key (which may be time consuming) need not be performed. For example, if the encrypted information 224 represents a credit card account number and the user of mobile device 200 will be making a number of purchases with the credit card account in a short period of time, then the cached decryption key 226 can be quickly accessed. In certain embodiments of mobile device 200, cache memory element 220 is utilized to temporarily store unencrypted information 228 for a caching period. This may be desirable to enable quick processing of unencrypted information 228 during the caching period. Cache memory element 220 may also be configured to store data associated with the various applications supported by mobile device 200 and other information that may relate to conventional operating features of mobile device 200. Cache memory element 220 may also store unencrypted or "plain text" data (such as metadata) that describes or is otherwise associated with decryption key(s) 226 and/or unencrypted information 228.

Secure data module 212, which may be realized as hardware, software, and/or firmware, is suitably configured to perform encryption and/or decryption of data stored by mobile device 200. In one embodiment, secure data module 212 decrypts encrypted information 224 using $KEY_{data}^{user}$, which is received from key server 202. As a result of the decryption process, secure data module 212 generates unencrypted information that corresponds to encrypted information 224. Secure data module 212 may also cooperate with key module 214 and/or data handling application 216 as necessary to support the data protection schemes described herein. In practice, secure data module 212 or a portion thereof may be considered to be a part of the processing architecture of mobile device 200.

Secure data module 212 may also be configured to establish a secure channel between mobile device 200 and POS terminal 108 (see FIG. 1) during payment transactions to ensure that the transfer of information remains protected. Likewise, secure data module 212 may be configured to establish a secure over-the-air channel between mobile device 200 and key server 202 to ensure that such network communications remain secure. Secure data module 212 may also require the user of mobile device 200 to enter a password, a key, or a PIN for network authentication purposes.

Key module 214, which may be realized as hardware, software, and/or firmware, is suitably configured to receive keys from a source that is remote from mobile device 200. The keys may be received in a protected manner, e.g., via SSL/TLS, or the like. In this example, key module 214 receives the $KEY_{data}^{user}$ from key server 202, where $KEY_{data}^{user}$ enables mobile device 200 to decrypt the encrypted information 224 stored in memory element 218. In practice, key module 214 may be coupled to communication module 210, which enables key module 214 to obtain keys from key server 202.

As mentioned briefly above, data handling application 216 manages, processes, and otherwise handles the unencrypted information after it has been decrypted by mobile device 200. In one embodiment, data handling application 216 is a payment transaction application that handles payment transactions initiated by mobile device 200. For example, data handling application 216 can provide the overall feature set and functionality that enables mobile device 200 to perform electronic transactions with POS terminal 108 (see FIG. 1).

Key server 202 can communicate with mobile device via communication link 204. Key server 202 may include, without limitation: a database 230; an authentication module 232; a communication module 234; and a processing architecture 236. Some or all of these elements may be coupled together using any suitable interconnection arrangement or architecture. Although not shown in FIG. 2, key server 202 may also include a number of features and components that may be utilized to support conventional features of key server 202, and such conventional features will not be described in detail herein.

Processing architecture 236 may have the general characteristics described above for the processing architecture of mobile device 200. Namely, processing architecture 236 is configured to support the operation of key server 202, including the data protection schemes described in more detail herein. Processing architecture 236 may be realized with any number of hardware, software, and/or firmware components, and processing architecture 236 may include any number of logical or functional modules.

Key server 202 may include or communicate with database 230, which includes one or more decryption keys and/or one or more encryption keys utilized by mobile devices, such as mobile device 200. In this example, key server 202 manages at least one decryption key for mobile devices, including the particular $KEY_{data}^{user}$ for mobile device 200. In practice, mobile device 200 may utilize symmetric keys (i.e., the same key used for encryption and decryption), public-private key pairs, randomly generated keys, or any suitable encryption/decryption keys. A key such as $KEY_{data}^{user}$ may be realized as a string of bits having an appropriate length, for example, 1024 bits. The actual number of bits in $KEY_{data}^{user}$ may be dictated by the desired level of security, the mobile device platform, and other practical operating considerations.

Authentication module 232 supports one or more authentication procedures performed by key server 202. As described below, an authentication procedure can be performed for a user of mobile device 200 to ensure that the user is authorized to access keys managed by key server 202. In this regard, authentication module 232 can support any number of suitable authentication protocols, including, without limitation: password authentication (what you know); biometric data authentication (what you are); smartcard-based authentication (what you have); and handwriting-based authentication (what you do). Due to the fact that the encryption/decryption keys are managed by key server 202, a simple authentication scheme may be desirable: an ATM-like PIN code or a short alphanumeric password that can be entered using the user interface 206 of mobile device 200. Thus, key server 202 can process the PIN or password to authenticate the user before sending the $KEY_{data}^{user}$ to mobile device 200. In practice, key server 202 may be configured to withhold or refuse transmission of the $KEY_{data}^{user}$ if the user fails to enter the correct PIN or password after a specified number of attempts. If this occurs, a genuine and legitimate user may be able to unlock the system by contacting a customer service representative. Authentication module 232 adds another layer of protection to the system, and allows key server 202 to withhold or prevent transmission of the decryption key if the authentication procedure does not authenticate the user of mobile device 200.

Communication module 234 may be generally configured as described above for communication module 210 of mobile device 200. Communication module 234 is suitably configured to transmit keys to mobile device 200 on an as-needed basis to support the data protection schemes described herein. For example, communication module 234 may be configured to transmit a decryption key to mobile device 200 if authentication module 232 authenticates the user of mobile device 200.

Using the system depicted in FIG. 2, the user's private data is stored in an encrypted form on his/her mobile device 200. The dedicated secure data module 212 decrypts the stored data items on demand. Secure data module 212 also encrypts newly entered or modified items for local storage in memory element 218 as needed. In this embodiment, the symmetric key used for encryption/decryption ($KEY_{data}^{user}$) is retrieved from key server 202, which may be maintained and/or administered by a service provider for mobile device 200. The transmission of the $KEY_{datauser}$ is preferably performed after the user has authenticated himself to key server 202, and the $KEY^{data}_{user}$ need not be stored permanently in mobile device 200. Consequently, a thief who cannot authenticate himself to key server 202 will be unable to obtain the private data in clear-text form, even if he is the best hacker in the world. For added protection, communication link 204 can be protected using any suitable technique. For example, SSL/TSL could be used to secure communication link 204 (whether or not $KEY_{data}^{user}$ is actually encrypted).

The operation of the data protection system depicted in FIG. 2 is described in more detail below in the context of FIGS. 5-7.

Figure 3:
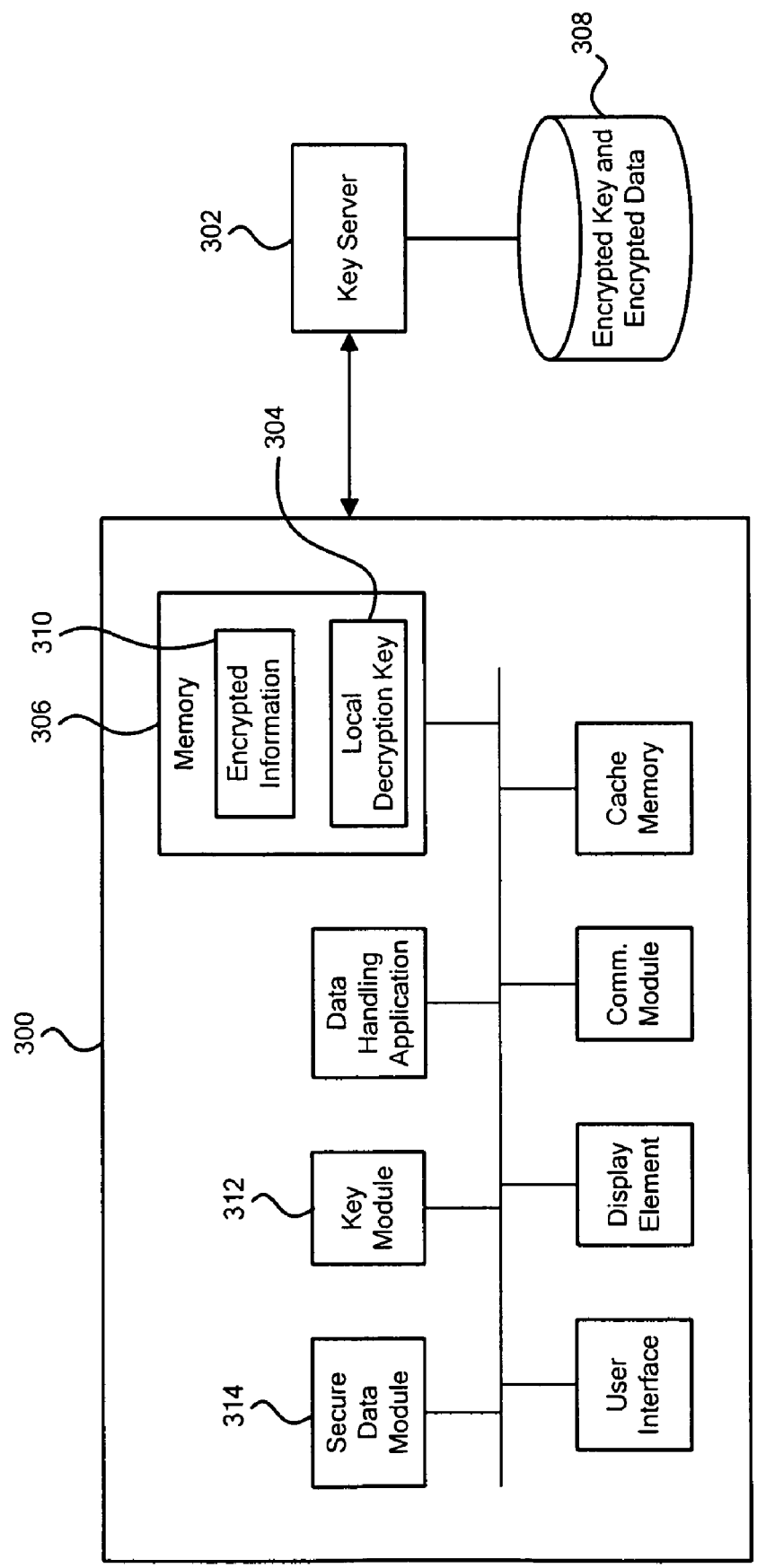
FIG. 3 is a schematic representation of a mobile device and a remote key server configured to support a network-based data protection scheme for the mobile device.

FIG. 3 is a schematic representation of a mobile device 300 and a remote key server 302 configured to support a network-based data protection scheme for mobile device 300. Certain features and elements of mobile device 300 and key server 302 are similar to corresponding features and elements described above in the context of mobile device 200 and key server 202. For the sake of brevity, common features and elements will not be redundantly described here in the context of FIG. 3.

The system depicted in FIG. 3 adds another layer of security to the system depicted in FIG. 2. In this embodiment, the data key for mobile device 300 ($KEY_{data}^{user}$) is encrypted with a device-specific symmetric or asymmetric key ($KEY_{device}$), essentially adding one more layer of encryption. This local decryption key 304 can be generated automatically and stored in a memory element 306 of mobile device 300, or it can be derived from a user-entered strong password. Key server 302 may be utilized to manage and/or store encrypted versions of keys (in, for example, a database 308) utilized by mobile devices. For example, the decryption key utilized by mobile device 300 to decrypt the encrypted information 310 may be encrypted with $KEY_{device}$, resulting in an encrypted version of the decryption key. Thus, key server 302 need not retain $KEY_{data}^{user}$ in plaintext itself, thus making key server 302 less vulnerable to attack.

In practice, a user may be able to create her device-specific key ($KEY_{device}$) by executing a one-time setup procedure. Assuming that the respective $KEY_{data}^{user}$ is currently cached, mobile device 300 can send an appropriate message to key server 302. For example, mobile device 300 may send the following message to key server 302:

---

$KEY_{device}$ = CreatePhoneKey( )
$M_{key\_setup}$ = ENCRYPT (
    $KEY_{public}^{service}$,
    User ID | User PIN | $KEY_{comm}^{user}$ |
    ENCRYPT ($KEY_{device}$, $KEY_{data}^{user}$) |
    Random Sequence | Time
    )

---

After receiving this message, key server 302 stores the encrypted version of $KEY_{data}^{user}$ and returns an appropriate acknowledgment. During subsequent communication, key server 302 transmits the encrypted version of $KEY_{data}^{user}$. Similar to that described above, key server 302 may be configured to transmit the encrypted version of $KEY_{data}^{user}$ only if key server 302 authenticates the user of mobile device 300. In this example, the key module 312 receives the encrypted version of $KEY_{data}^{user}$, and the secure data module 314 decrypts the encrypted version of $KEY_{data}^{user}$ (using the stored local decryption key 304) to obtain the unencrypted version of $KEY_{data}^{user}$.

The operation of the data protection system depicted in FIG. 3 is described in more detail below in the context of FIGS. 5-7.

Figure 4:
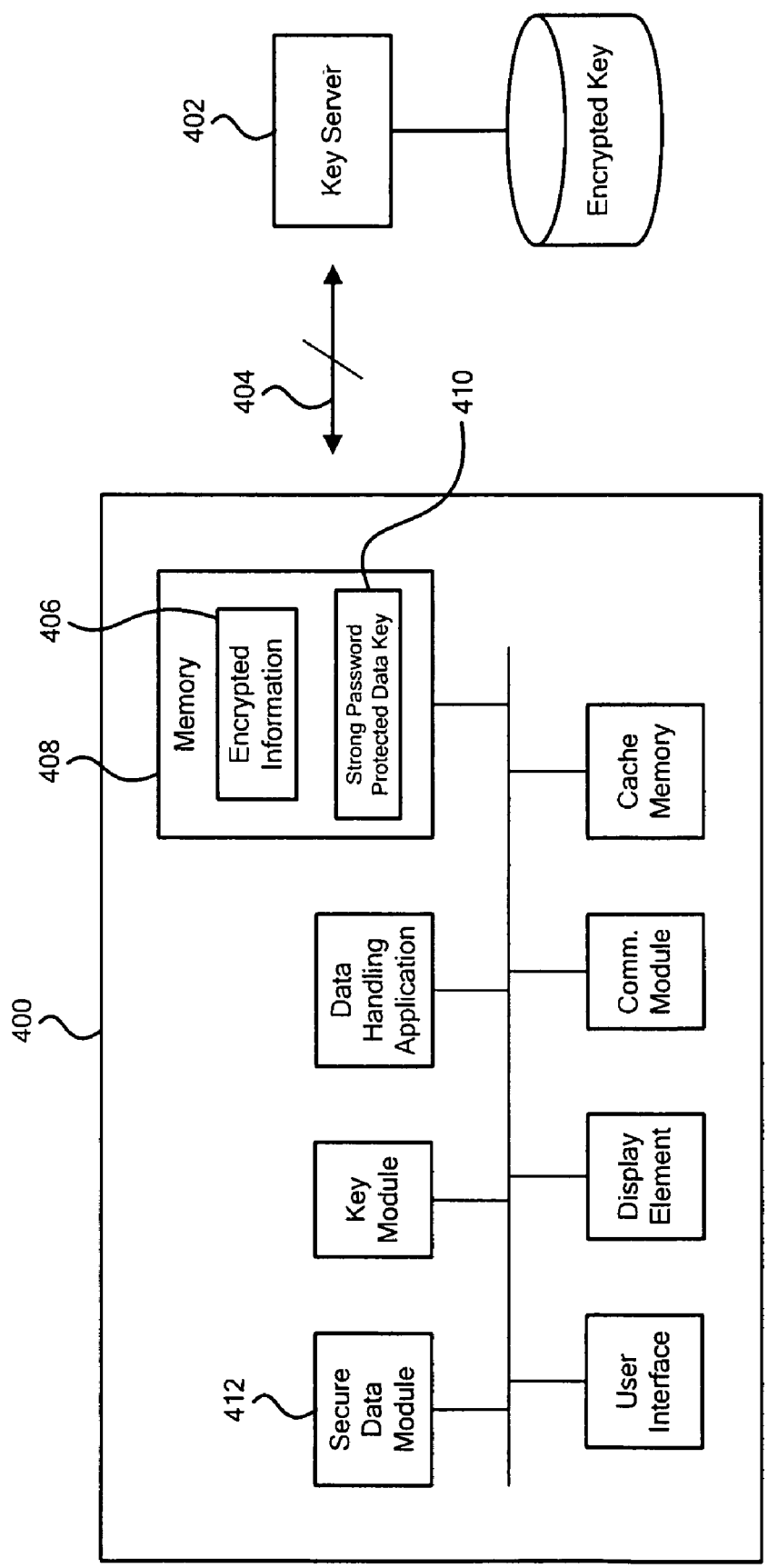
FIG. 4 is a schematic representation of a mobile device configured to support a data protection scheme in the absence of network connectivity.

FIG. 4 is a schematic representation of a mobile device 400 configured to support a data protection scheme in the absence of network connectivity. In other words, FIG. 4 depicts an operating condition where mobile device 400 cannot communicate with a key server 402 as described previously (the "broken" link 404 in FIG. 4 represents this loss of connectivity). This condition may occur if mobile device 400 is out of the wireless coverage area, if key server 402 is inoperative, if the channel between mobile device 400 and key server 402 is of poor quality, etc. Certain features and elements of mobile device 400 and key server 402 are similar to corresponding features and elements described above in the context of mobile device 200 and key server 202. For the sake of brevity, common features and elements will not be redundantly described here in the context of FIG. 4.

The system depicted in FIG. 4 enables the user of mobile device 400 to access the encrypted information 406 even though mobile device 400 cannot retrieve the $KEY_{data}^{user}$ from key server 402. Briefly, the memory element 408 of mobile device 400 is configured to store an encrypted version of $KEY_{data}^{user}$ as an encrypted key 410. This encrypted key 410 may be treated as a "backup" key that can be accessed when key server 402 is unavailable or when mobile device 400 cannot communicate with key sever 402. In this example, the secure data module 412 is suitably configured to decrypt the encrypted version of the $KEY_{data}^{user}$ (i.e., encrypted key 410) to retrieve the $KEY_{data}^{user}$ itself. Thereafter, mobile device 400 can decrypt the encrypted information 406 using the techniques described above in the context of FIG. 2.

The system depicted in FIG. 4 provides another mechanism for mobile device 400 to access the $KEY_{data}^{user}$. As mentioned above, an encrypted version of the $KEY_{data}^{user}$ is stored in mobile device 400. The corresponding decryption key for encrypted key 410 may be accessed with or derived from a user-entered password. In practice, this password should be relatively strong; for example, the password should include at least eight characters of alphanumeric combination (possibly including both uppercase and lowercase letters). The stronger the password, the better the protection against hacking. The password should be long enough to defeat brute-force hacking attempts if mobile device 400 is stolen. Alternatively, mobile device 400 may leverage audio-based, video-based, or other biometric-based authentication schemes in this context. In shorthand nomenclature, this process is represented by:

Encrypted $KEY_{data}^{user}$=
ENCRYPT(Derived_Key(strong password), $KEY_{data}^{user}$).

Under this scheme, the user has two ways to access his/her decryption key: (1) when mobile device 400 is in the coverage area, the user can simply enter a short and convenient PIN code and rely on the network activation method described above to retrieve encrypted data key $KEY_{data}^{user}$ from key server 402; and (2) when mobile device 400 is out of the coverage area, the user can choose to enter a strong password (e.g., one that is longer and less convenient to enter than a short PIN code) to retrieve $KEY_{data}^{user}$ locally. The first option represents an optimized scheme where a short and easily memorized PIN code can be quickly and conveniently entered by the user, while the network activation methodology provides added security.

In the event of loss or theft of mobile device 300, the user enters the strong password to derive the local decryption key 304 and stores it on the new phone. It then contacts the server to request a copy of encrypted data and a copy of the encrypted data key. In practice, a careful authentication will be required before the user can download a copy of the encrypted data from the server. This authentication could be a part of the activation for the replacement phone itself. The user may also be required to visit the vendor's store to complete this step. The encrypted data stored on the server is the same as encrypted information 3 10; it is a redundant copy. When the mobile device is lost, the user can obtain a copy of the encrypted data from the server.

The operation of the data protection system depicted in FIG. 4 is described in more detail below in the context of FIGS. 5-7.

A data protection scheme as described herein combines a very simple and familiar user input (e.g., a PIN code) with strong cryptography, thereby simultaneously achieving ease of use and strong security. People are very familiar with PIN codes for ATM machines and, therefore, resistance and confusion among users should not be an issue.

In practice, a thief would need to steal the mobile device and compromise the key server in order to recover the private data stored in the mobile device. By storing the user data on each individual mobile device rather than in a central database, the data protection scheme distributes liabilities and points of attacks between the mobile device and the service provider. By design, the data protection scheme automatically avoids any widespread privacy attacks that might otherwise affect millions of users. A hacker may obtain the private data keys for all users from a compromised key server, but he would then need to physically steal the mobile devices. In contrast, a centralized data store attracts and remains vulnerable to such attacks, even if the user data is encrypted on the server.

In addition to being a less likely target for hacking than a centralized data store, the key distribution service itself can be made more secure against penetration because of the simplicity in the protocols. In general, a simpler system is easier to secure. In this regard, the key server need not be responsible for anything other than user authentication and key transmission. By comparison, a centralized data store may support a far richer interface sometimes out of necessity, to act on behalf of the user. For example, the data server can send the user's credit card information directly to the merchant.

Moreover, the data protection scheme described herein requires no dedicated hardware and is straightforward to implement on existing platforms.

Figure 5:
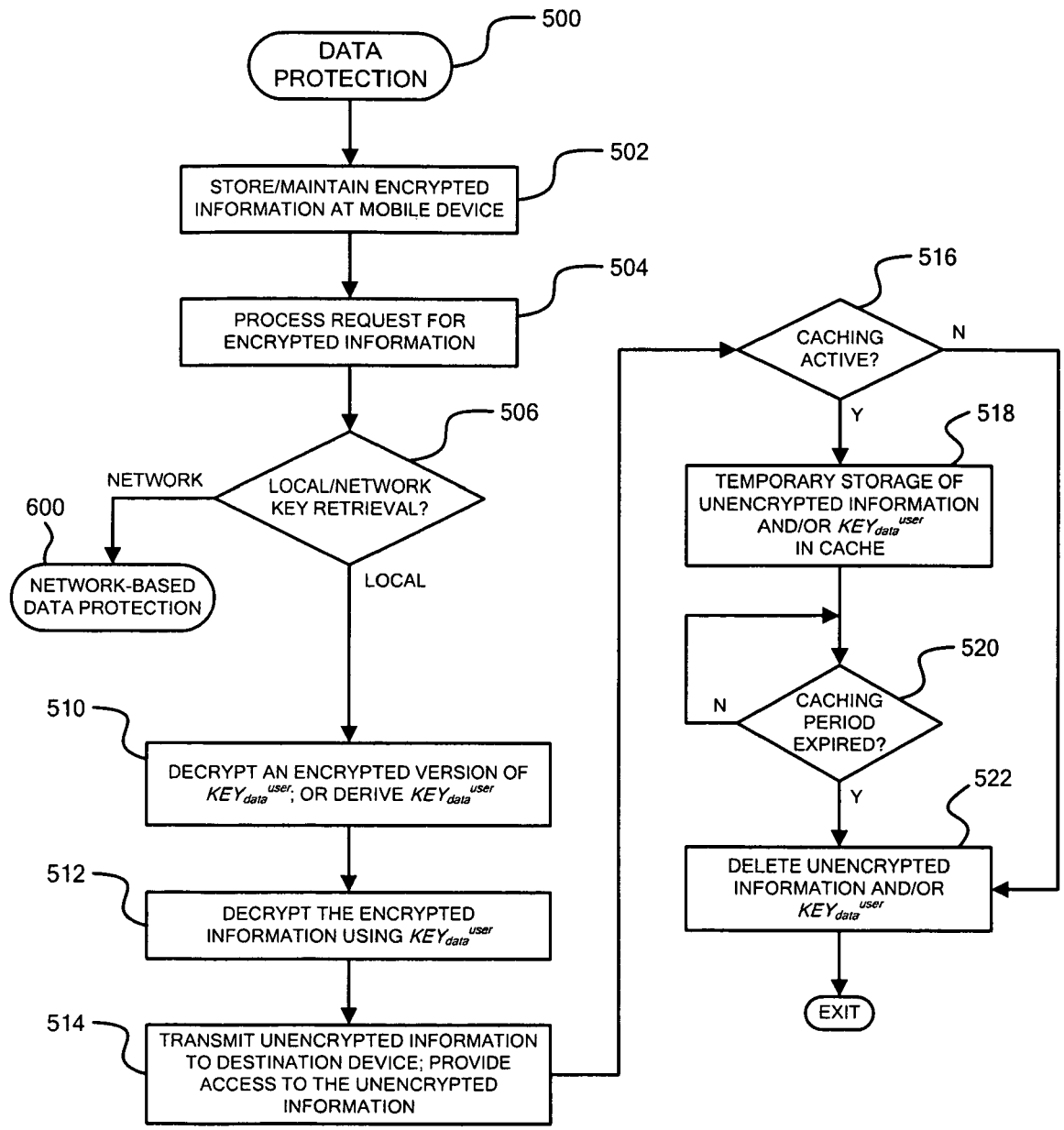
FIG. 5 is a flow chart that illustrates a data protection process for a mobile device.

FIG. 5 is a flow chart that illustrates a data protection process 500 for a mobile device. The various tasks performed in connection with process 500 (and other processes described below) may be performed by software, hardware, firmware, or any combination thereof. For illustrative purposes, the following description of the various processes may refer to elements mentioned above in connection with FIGS. 1-4. In practical embodiments, portions of a given process may be performed by different elements of the described system. It should be appreciated that a given process may include any number of additional or alternative tasks, the tasks shown in the figures need not be performed in the illustrated order, and a given process may be incorporated into a more comprehensive procedure or process having additional functionality not described in detail herein.

Data protection process 500 may begin by storing or maintaining encrypted information in a memory element of the mobile device (task 502). In one embodiment, the plaintext information is encrypted using the encryption process described below (see FIG. 7). In practice, the encrypted information can be stored in the mobile device indefinitely and need not be accessed or manipulated until needed by the mobile device. As mentioned above in connection with the description of FIG. 2, the encrypted information may reside in the memory element until access is requested by a data handling application running on the mobile device, for example, an electronic payment transaction application. In this regard, process 500 may perform a task 504 to process a request for the encrypted information. The mobile device responds to this request and attempts to obtain the appropriate decryption key ($KEY_{data}^{user}$ in this example) for the encrypted information.

In this embodiment, the mobile device can retrieve the $KEY_{data}^{user}$ via a network-based key server or from local memory via a secure technique. As explained above, network retrieval may be the default scheme, with local retrieval serving as a backup measure. If the mobile device is to retrieve the $KEY_{data}^{user}$ using the key server (query task 506), then data protection process 500 may proceed to a network-based data protection process 600 (see FIG. 6). Otherwise, process 500 may attempt to perform local retrieval as described above.

Local retrieval of the $KEY_{data}^{user}$ may be initiated by a suitable user authentication procedure. For example, the mobile device may prompt the user to enter a password, a PIN code, a spoken phrase, or the like. This example assumes that a strong password is used for local retrieval of the $KEY_{data}^{user}$. Using the strong password (P), the mobile device derives a symmetric key (K) using a suitable algorithm (F), such that K=F(P). The mobile device will then decode the locally kept, encrypted data (D) into plaintext ($D_p$) using the derived key (K). Thereafter, the mobile device can check the integrity of the decrypted data ($D_p$). If the derived key (K) is incorrect due to an incorrect password, then the integrity check will fail. If the password is correct, then the derived key (K) will be correct and the decrypted data ($D_p$) will be correct. The integrity checking procedure may utilize any suitable technique, including checksum techniques.

Thus, if the password is correct, then process 500 may proceed to decrypt an encrypted version of the $KEY_{data}^{user}$ (task 510). Alternatively, process 500 may utilize the password to generate or derive the $KEY_{data}^{user}$. Once the mobile device has obtained the unencrypted $KEY_{data}^{user}$, it can then decrypt the desired encrypted information that is stored in the memory element of the mobile device (task 512). In practice, the mobile device decrypts the encrypted information using the decryption key and generates unencrypted information suitable for additional processing or handling.

The mobile device can process the unencrypted information in any manner. For example, the mobile device may transmit the unencrypted information (task 514) to a destination device or system, such as a POS terminal. In practice, the transmission of the unencrypted information may be performed "on the fly" in a pass-through manner such that the unencrypted information only appears on the mobile device in a transient manner. Alternatively or additionally, the mobile device may provide access to the unencrypted information to a destination device that is remote from the mobile device, such as a POS terminal, an external computing device, or the like.

Some mobile device embodiments may utilize a cache memory element configured for temporary storage of data. If the caching feature is inactive (query task 516), then process 500 may proceed to delete the unencrypted information and/or the $KEY_{data}^{user}$ from the mobile device (task 522). This deletion ensures that the sensitive data is purged from the mobile device after it transmits the data or makes it available to an external device. Otherwise, process 500 may initiate temporary storage of the unencrypted information and/or the $KEY_{data}^{user}$ in the cache memory element (task 518). The cache memory element may store the unencrypted information and/or the $KEY_{data}^{user}$ for the designated caching period of time (query task 520). If the caching period has expired, then process 500 may proceed to task 522 to delete the unencrypted information and/or the $\text{KEY}^{data}_{user}$ from the mobile device. Thereafter, process 500 may exit or it may be re-entered at an appropriate point, such as task 502.

Figure 6:
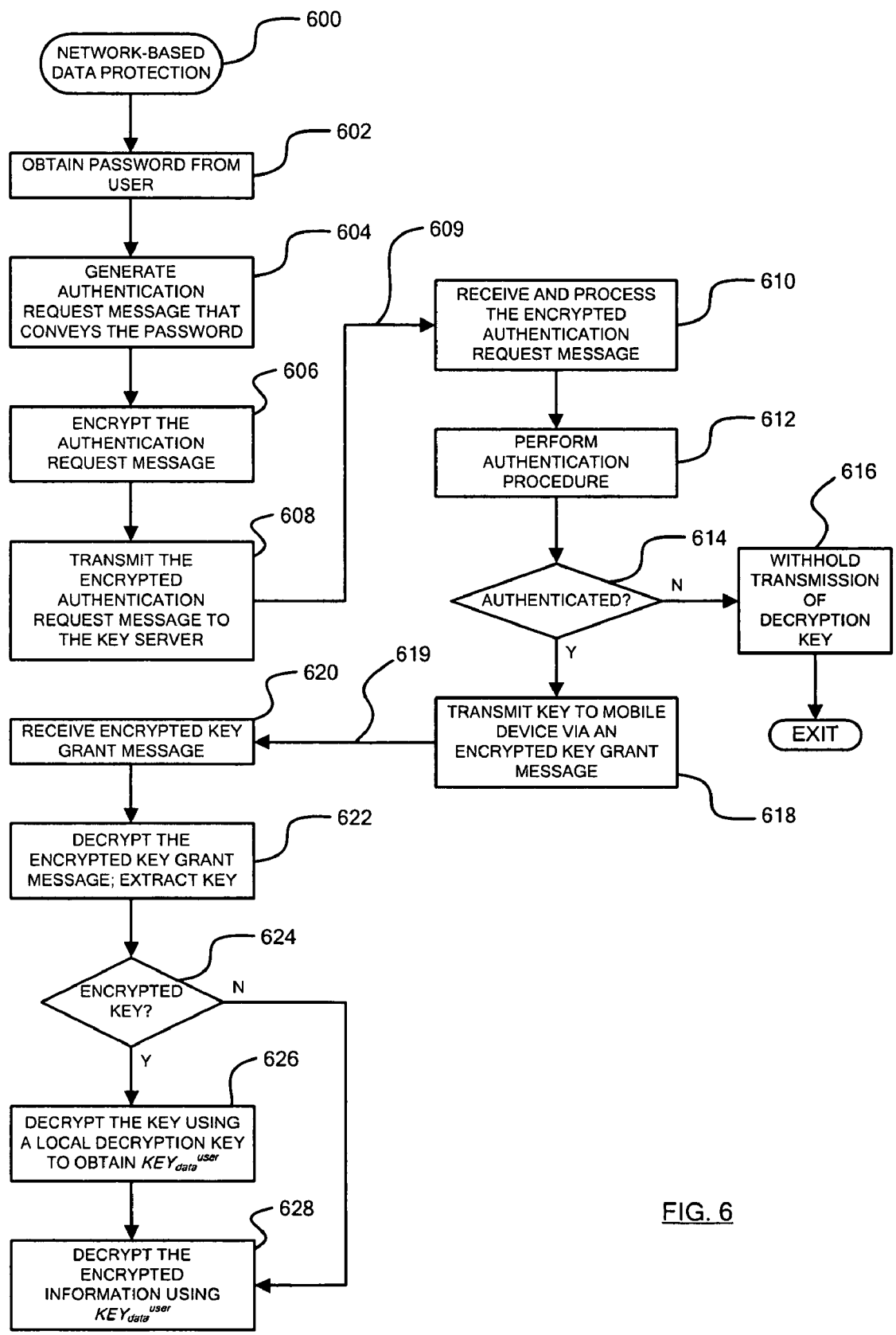
FIG. 6 is a flow chart that illustrates a network-based data protection process for a mobile device.
Figure 7:
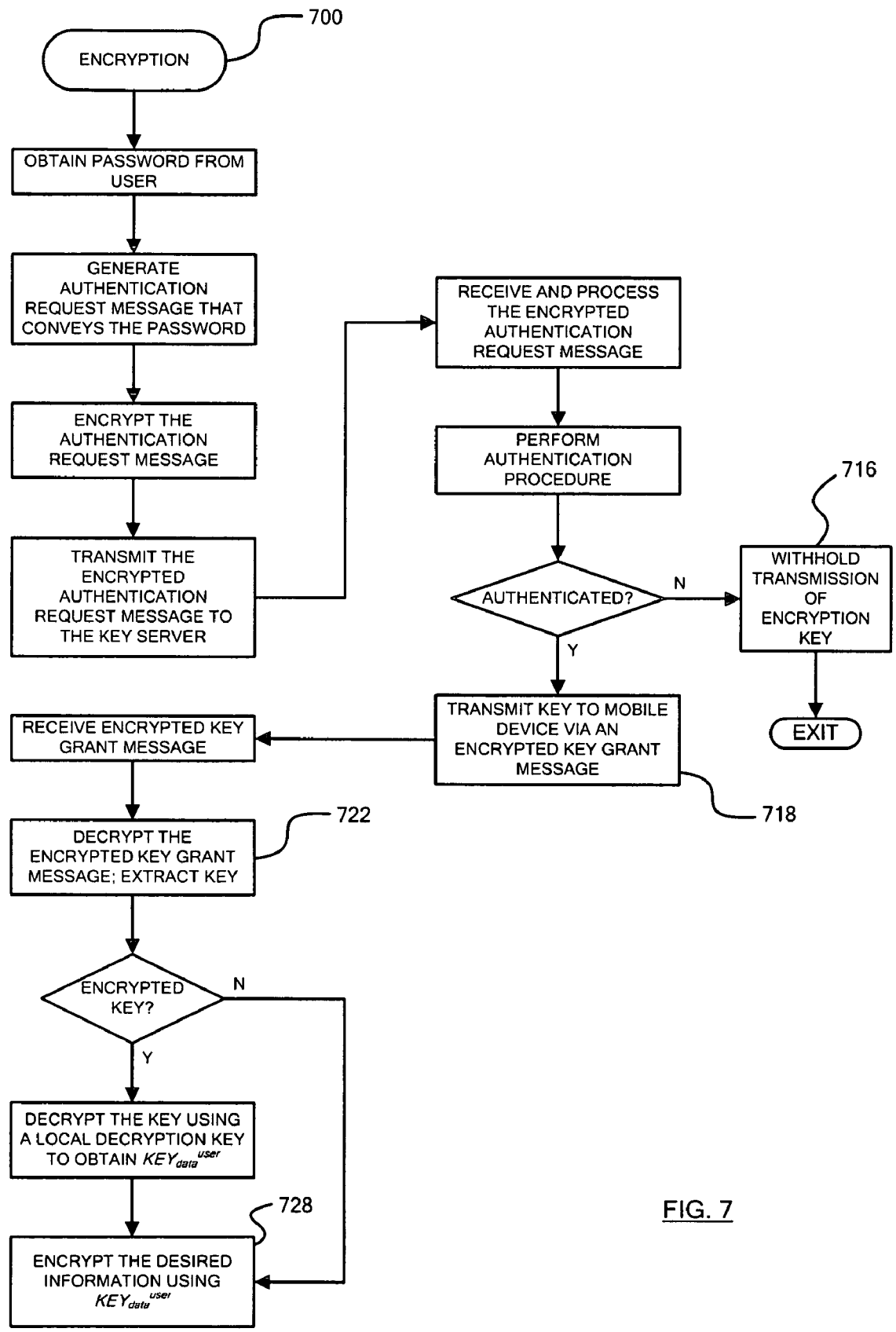
FIG. 7 is a flow chart that illustrates encryption of information for a mobile device.

FIG. 6 is a flow chart that illustrates a network-based data protection process 600 for a mobile device. Process 600 may, but need not, be performed in connection with data protection process 500 (see FIG. 5). Process 600 assumes that encrypted information is stored at a mobile device, and that a user of the mobile device (or an application running on the mobile device) seeks to decrypt the encrypted information. In this embodiment, process 600 utilizes a relatively simple password scheme. Thus, process 600 may begin by obtaining a user-entered password at the mobile device (task 602). Eventually, the mobile device communicates the password (or data indicative of the password) to the key server for authentication of the user.

In this example, the mobile device generates an authentication request message that conveys the password (task 604), encrypts the authentication request message (task 606) to obtain an encrypted authentication request message, and transmits the encrypted authentication request message to the key server (task 608). Network-based data protection process 600 may employ encrypted messaging in this manner to establish a secure communication channel between the mobile device and the key server, thus adding over-the-air security to the system. As mentioned above, standard protocols such as Kerberos and SSL/TLS could be utilized as plug-in solutions in this context.

The arrow 609 represents a transition from the mobile device to the key server. This example assumes that the key server actually receives the encrypted authentication request message from the mobile device (task 610). This allows the key server to process the received message in an appropriate manner. For example, the key server may decrypt the authentication request message before processing its contents. In response to the authentication request message, the key server can perform a suitable authentication procedure (task 612) for the user of the mobile device. In this regard, the key server may extract the password from the authentication request message and process the password to determine its validity. If the key server does not authenticate the user (query task 614), then it may withhold or prevent transmission of a key (task 616). In other words, the key server will not respond to the authentication request message and the key server will not provide any keys to the mobile device, thus preserving the integrity of the encrypted information stored at the mobile device.

If the key server authenticates the user (query task 614), then the key server will transmit one or more keys to the mobile device (task 618). A transmitted key may be, for example, a decryption key such as $\text{KEY}_{data}^{user}$, an encrypted version of the $\text{KEY}_{data}^{user}$, an encryption key, or the like. In this example, the key or keys are transmitted via an encrypted key grant message generated by the key server. The encrypted key grant message provides additional over-the-air security for the system.

The authentication protocol in this example allows the mobile user to authenticate himself to the key server to retrieve his personal data key. The protocol is a message-based, connectionless protocol that need not include more than two messages: the authentication request message ($\text{M}_{authentication}$) and the key grant message from the server ($\text{M}_{key-grant}$). These messages can be encrypted to thwart eavesdropping and man-in-the-middle attacks. Such encryption can make use of two sets of keys: a public-private key pair ($\text{KEY}_{public}^{service}$, $\text{KEY}_{private}^{service}$) for the key server; and a communication key ($\text{KEY}_{comm}^{user}$) for each mobile device. The public key ($\text{KEY}_{public}^{service}$) may be installed on the mobile device at the time of service activation, and a new communication key ($\text{KEY}_{comm}^{user}$) can be generated for each authentication session and discarded immediately thereafter. The following are examples of these messages:

---

$\text{M}_{authentication}$ = ENCRYPT (
  $\text{Key}_{public}^{service}$,
  User ID | User PIN | $\text{KEY}_{comm}^{user}$ | Random Sequence | Time
  )

$\text{M}_{key-grant}$ = ENCRYPT(
  $\text{KEY}_{comm}^{user}$,
  $\text{KEY}_{data}^{user}$ | Random Sequence | Time | Signature
  )

---

The random sequence in the above expressions is picked by the mobile device and is utilized, along with the time information, to detect potential replay attacks. A 32-bit or 64-bit number should suffice for the random sequence. An optional signature, generated with the server's private key ($\text{KEY}_{private}^{service}$), can be included in the reply message ($\text{M}_{key-grant}$).

Referring again to FIG. 6, the arrow 619 represents a transition from the key server to the mobile device. Network-based data protection process 600 assumes that the mobile device actually receives the encrypted key grant message from the key server (task 620). For this example, the encrypted key grant message includes or otherwise conveys the decryption key ($\text{KEY}_{data}^{user}$) or an encrypted version of $\text{KEY}_{data}^{user}$. Thus, the mobile device will decrypt the encrypted key grant message to obtain an unencrypted key grant message, and extract the transmitted key from the unencrypted key grant message (task 622).

Depending upon the system embodiment, the extracted key may be an encrypted key or it may be the actual decryption key needed to decrypt the desired encrypted information stored at the mobile device. If the extracted key is an encrypted key (query task 624), then the mobile device may proceed to decrypt the extracted key to obtain an unencrypted key (task 626). In this example, the unencrypted key represents $\text{KEY}_{data}^{user}$. As described above in the context of FIG. 3, the encrypted key may be unlocked or decrypted using a local decryption key that is maintained by the mobile device. In practice, the local decryption key may be stored in a secure manner by the mobile device (for example, the password obtained in task 602 may also be utilized to make the local decryption key accessible, or the password may be utilized to derive the local decryption key). Eventually, the mobile device decrypts the encrypted information (task 628) with the $\text{KEY}_{data}^{user}$ retrieved during the process described above. Task 628 is also performed if the extracted key is not an encrypted key (query task 624).

The encrypted information stored at the mobile device can be encrypted and stored using any suitable technique or technology. For example, the encrypted information may be pre-stored in the mobile device and activated by the user in an appropriate manner. Alternatively, the encrypted information may be downloaded into the mobile device using any data transport mechanism. In one system embodiment, information can be encrypted for storage at the mobile device using the same general process described above in connection with FIG. 6. In other words, the mobile device may be configured to obtain an encryption key (rather than a decryption key) from a key server. Indeed, if a symmetric encryption/decryption key is utilized by the system, the same $\text{KEY}_{data}^{user}$ will also serve as the data encryption key. In this regard, FIG. 7 is a flow chart that illustrates an encryption process 700 for information stored at a mobile device.

Encryption process 700 can be performed when the user of the mobile device desires to save sensitive data in an encrypted format in the memory of the mobile device. The tasks in process 700 are similar or identical to counterpart tasks in network-based data protection process 600 and, therefore, the tasks in process 700 will not be described in detail herein. Indeed, the following description of process 700 will only concentrate on tasks that are numbered in FIG. 7.

Briefly, encryption process 700 performs user authentication as described previously for network-based data protection process 600. If the user is not authenticated, then the key server will withhold or prevent transmission of the necessary encryption key (task 716). On the other hand, if the user is authenticated, then the key server will transmit an encryption key to the mobile device via, for example, an encrypted key grant message (task 71 8). As described above, the encryption key itself may be encrypted to add another layer of security to the system.

In the context of task 722 of encryption process 700, the mobile device will extract an encryption key (or an encrypted version of the encryption key). In this example, the symmetric key ($KEY_{data}^{user}$) serves as the encryption key. Thus, process 700 can encrypt the desired information using $KEY_{data}^{user}$ as the encryption key (task 728). Thereafter, the encrypted information generated by the mobile device can be stored in the memory element of the mobile device for subsequent decryption using any of the schemes described above.

The system described herein is; relatively immune to different forms of attack. For example, it can be assumed that an attacker has the ability to intercept, replace, and replay messages in the authentication and key-retrieval protocol, but is unable to break the encryption algorithm in any meaningful way.

Attacks Based on Message Interception

An attacker may be able to eavesdrop on the phone-server conversation and inject his own messages in the air. The "strong encryption" assumption ensures that the attacker cannot create a useful message either from scratch or by modifying an existing message. Therefore, the best he can do is to replay the intercepted messages to either the mobile device, the key server, or both.

Replaying the authentication request message to the key server, if it works at all, only provides the attacker with the same reply message that he has already intercepted. Thus, the attacker gains nothing here. Note that a key server can always detect and thwart a message replay by both caching previously-seen messages for a certain amount of time, and by ignoring a message with too old a timestamp.

The attacker can also replay a recorded authentication reply to the user's mobile device. If the mobile device is in the state of awaiting a reply from the key server, the replayed reply message must have come from a previous authentication session or belong to a different mobile device, and as a result is encrypted with a different communication key from what the mobile device currently uses. This reply will be rejected due to key mismatch.

Attacks Using a Stolen Mobile Device

Assuming that the thief is also an expert hacker, with a stolen mobile device, he can inspect and tamper with the client software and data stored in the mobile device. Outside the potentially vulnerable window of local caching, the hacker must either correctly guess the PIN code or use message replays to trick the mobile device. The former attempt will be caught quickly by the service provider. In the latter approach, the attacker now has the option to set the program state before replaying messages to the mobile device. However, replaying the message to the mobile device does not work unless the attacker can correctly guess the one-time communication key ($KEY_{comm}^{user}$). The probability of success is near zero.

Attacks Using a Compromised Server

In one embodiment, the key server contains the private data key ($KEY_{data}^{user}$) for all users. Once the key server is compromised, the hacker can obtain these keys in an attempt to decrypt a user's private data. However, given that the user's data is stored on a mobile device, the attacker still needs to obtain the physical device in order to make use of the stolen key.

Attacks Using Both the Compromised Server and a Stolen Mobile Device

In the rare case where an attacker both compromises the key server and steals the mobile device, the attacker can retrieve the user's private data using the stolen private-data key. Although this is serious threat, the likelihood of occurrence is extremely low. Secondly, this type of attack can only be performed on a per-individual basis. A widespread attack is virtually impossible with the data protection scheme described herein.

Threat Mitigation for Stolen Mobile Devices

As stated above, a thief will have the easiest time if he steals the mobile device within the potentially vulnerable window of local caching. Outside this window, the thief will have an extremely difficult time recovering any useful data from the stolen mobile device. Furthermore, when the theft is promptly reported, the service provider can immediately block the user's private data key from being released and remotely lock the mobile device if the latter option is available.

In the case when the mobile device is stolen before the local cache is expunged, data theft or misappropriation can still be prevented by software and hardware-based protection techniques. For example, the mobile device hardware can be designed to prevent memory snooping and booting from an unauthorized operating system, and software protection techniques can make sure that only authorized programs can be run on the mobile device and that software debugging is disabled.

When the user gets a new mobile device to replace the stolen one, the service provider should create a new data key and, if server-side caching is available, optionally re-encrypt and install on the new mobile device the cached copy of the user's data using the new key. This process can be performed either by the service provider prior to shipping the new mobile device to the user or by the technician at a retail store. As described above, the old data key could be retrieved from the server and used instead of a new key. However, creation of a new key is more secure, e.g., if the old key happens to be cached on the stolen device, of if the information encrypted with the old key is useful somehow for cryptanalysis or other purposes.

Recovering From a Compromised Server

A compromised key server allows the hacker to obtain every user's data key and in rare cases the service provider's private key. If the private key remains uncompromised, a hacked server poses an immediate risk only to those users whose phones are stolen. For all other users, the service provider can always safely change data keys using the existing key retrieval protocol.

More specifically, once the service provider notices that its key server has been hacked, it can fix the breaks and restart the key server in a key-replacement mode: the first time a user authenticates with the new key server, a new data key is generated and sent to the user's mobile device along with the old key; the mobile device uses the old key to decrypt existing (encrypted) private data items and re-encrypt them using the new key; afterwards, the old key is discarded. If server-side caching of user data is enabled the cached copy can be updated separately. Bandwidth permitting, the new server can simply send the updated copy along with the new key to the user's mobile device, without ever touching the old data key.

The above recovery process is immune to hijacking, because an eavesdropper cannot decipher the messages. However, if the service provider's private key is also compromised, the above protocol is vulnerable to eavesdropping and man-in-the-middle attacks. In this rare case, the user can rely on a secure, alternate channel, i.e., telephoning the service provider or personal visit to a retail store, to establish a new data key for his mobile device.

In summary, a network-based data protection system as described herein protects a mobile device user's private data against physical theft and server hijacking. The system effectively combines strong encryption and network-based key activation to provide a convenient user interface while keeping the probability of a successful hacking attempt to the minimum. The simplicity of the protection scheme facilitates acceptance by users, who will be more receptive to the security system than to other proposed schemes for mobile data protection.

While at least one example embodiment has been presented in the foregoing detailed description, it should be appreciated that a vast number of variations exist. It should also be appreciated that the example embodiment or embodiments described herein are not intended to limit the scope, applicability, or configuration of the systems, methods, or devices in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A data protection method for a mobile device, the method comprising:
   storing encrypted data in a memory element of the mobile device;
   storing, in the mobile device, a local copy of a decryption key to decrypt the encrypted data, wherein accessing the local copy of the decryption key entails user entry of first authentication data at the mobile device;
   determining whether a key server located remotely from the mobile device is available to communicate with the mobile device, the key server storing a remote copy of the decryption key, wherein accessing the remote copy of the decryption key entails user entry of second authentication data at the mobile device, the second authentication data being different from the first authentication data;
   when the key server is not available to communicate with the mobile device, decrypting the encrypted data with the local copy of the decryption key, provided a user enters the first authentication data to the mobile device;
   when the key server is available to communicate with the mobile device, receiving the remote copy of the decryption key from the key server, provided the user enters the second authentication data to the mobile device; and
   decrypting the encrypted data using the local or the remote copy of the decryption key to generate unencrypted data.

2. A method according to claim 1, wherein the remote copy of the decryption key is encrypted when received from the key server, and wherein the method further comprises:
   decrypting the encrypted remote copy of the decryption key.

3. A method according to claim 2 further comprising:
   storing the remote copy of the decryption key in a cache memory for a user-settable caching period; and
   clearing the remote copy of the decryption key from the cache memory when the user-settable caching period expires.

4. A method according to claim 1, wherein the second authentication data comprises a password entered by the user at the mobile device.

5. A method according to claim 4, further comprising communicating the password to the key server by:
   generating an authentication request message that conveys the password;
   encrypting the authentication request message to obtain an encrypted authentication request message; and
   transmitting the encrypted authentication request message to the key server.

6. A method according to claim 1, further comprising transmitting the unencrypted data to a destination device.

7. A method according to claim 6, further comprising deleting the unencrypted data from the mobile device after transmitting the unencrypted data to the destination device.

8. A method according to claim 1, further comprising providing access to the unencrypted data to a destination device that is remote from the mobile device.

9. A method according to claim 8, further comprising deleting the unencrypted data from the mobile device after providing access to the unencrypted data to the destination device.

10. A method according to claim 1, further comprising:
    receiving an encryption key from the key server; and
    encrypting data, using the encryption key, to generate the encrypted data.

11. A method according to claim 1, further comprising providing a destination device access to the unencrypted data prior to storing the remote copy of the decryption key in a cache memory of the mobile device for a user-settable caching period.

12. The method according to claim 1, implemented by the mobile device.

13. A method according to claim 12, wherein the mobile device implements the method using firmware or software executable by a processing device to determine whether to decrypt the encrypted data with the local copy of the decryption key or to receive the remote copy of the decryption key from the key server.

14. A method according to claim 12, wherein the mobile device implements the method using at least one programmable logic device that is configured to determine whether to decrypt the encrypted data with the local copy of the decryption key or to receive the remote copy of the decryption key from the key server.

15. A system comprising:
    a mobile device comprising a processing architecture configured to:
       store encrypted data in a memory element of the mobile device;
       store, in the mobile device, a local copy of a decryption key to decrypt the encrypted data, wherein accessing the local copy of the decryption key entails user entry of first authentication data at the mobile device;

determine whether a key server located remotely from the mobile device is available to communicate with the mobile device, the key server being configured to store a remote copy of the decryption key, wherein accessing the remote copy of the decryption key entails user entry of second authentication data at the mobile device, the second authentication data being different from the first authentication data;

when the key server is not available to communicate with the mobile device, decrypt the encrypted data with the local copy of the decryption key, provided a user enters the first authentication data to the mobile device;

when the key server is available to communicate with the mobile device, receive the remote copy of the decryption key from the key server, provided the user enters the second authentication data to the mobile device; and decrypt the encrypted data using the local or the remote copy of the decryption key to generate unencrypted data.

16. A system according to claim 15, further comprising the key server.

17. A system according to claim 15, wherein the processing architecture of the mobile device comprises firmware or software executable by a processing device to determine whether to decrypt the encrypted data with the local copy of the decryption key or to receive the remote copy of the decryption key from the key server.

18. A system according to claim 15, wherein the processing architecture of the mobile device comprises at least one programmable logic device that is configured to determine whether to decrypt the encrypted data with the local copy of the decryption key or to receive the remote copy of the decryption key from the key server.

19. A system according to claim 15, wherein the remote copy of the decryption key is encrypted when received from the key server by the mobile device, and wherein the processing architecture of the mobile device is further configured to:
    decrypt the encrypted remote copy of the decryption key.

20. A system according to claim 19, wherein the processing architecture of the mobile device is further configured to:
    store the remote copy of the decryption key in a cache memory for a user-settable caching period; and
    clear the remote copy of the decryption key from the cache memory when the user-settable caching period expires.

* * * * *